United States Patent [19]
Esteve et al.

[11] Patent Number: 5,878,382
[45] Date of Patent: Mar. 2, 1999

[54] METHOD AND APPARATUS FOR TIMING AND MONITORING INACTIVITY PERIODS

[75] Inventors: Denis Esteve, Vence; Jean-Pierre Marce, St. Jeannet; Pascal Thubert, Vence, all of France

[73] Assignee: International Business Machines Corporation, Armonk, N.Y.

[21] Appl. No.: 807,490

[22] Filed: Feb. 27, 1997

[30] Foreign Application Priority Data

Jun. 20, 1996 [EP] European Pat. Off. .............. 96480083

[51] Int. Cl.$^6$ ................................ G06F 13/00; G06F 1/32
[52] U.S. Cl. ....................... 702/176; 371/61; 395/750.05
[58] Field of Search ............. 702/176; 395/557, 395/682, 553, 839, 733, 750.05; 371/61

[56] References Cited

U.S. PATENT DOCUMENTS

| | | | |
|---|---|---|---|
| 4,220,990 | 9/1980 | Alles | 395/557 |
| 5,237,684 | 8/1993 | Record et al. | 395/682 |
| 5,305,454 | 4/1994 | Record et al. | 384/682 |
| 5,313,622 | 5/1994 | Truchard et al. | 371/61 |
| 5,384,906 | 1/1995 | Horst | 395/553 |
| 5,467,463 | 11/1995 | Siegel | 395/553 |
| 5,471,618 | 11/1995 | Isfeld | 395/839 |
| 5,491,815 | 2/1996 | Basso et al. | 395/553 |
| 5,497,481 | 3/1996 | Maeda | 395/553 |
| 5,542,076 | 7/1996 | Benson et al. | 395/733 |
| 5,557,548 | 9/1996 | Gover et al. | 702/176 |
| 5,584,031 | 12/1996 | Burch et al. | 395/750.05 |

*Primary Examiner*—John Barlow
*Assistant Examiner*—Hien Vo
*Attorney, Agent, or Firm*—John B. Frisone

[57] ABSTRACT

A method and apparatus for detecting the absence of an activity or event during a time period D divides the time period D into N equal time sub-periods. A register is reset upon the occurrence of an event or activity. The register is incremented at the end of each sub-period and examined to determine if it exceeds the value N in which case there has been no activity during the time period D. The precision of the measurement is regulated by increasing or decreasing the value of N and the sub-periods are determined by dividing D by N.

4 Claims, 6 Drawing Sheets

METHOD AND APPARATUS FOR TIMING AND MONITORING INACTIVITY PERIODS

BACKGROUND OF THE INVENTION

1. Field of Invention

The present invention relates to an event occurrence driven method and apparatus of a data processing system and more particularly to a method and an apparatus for timing and monitoring inactivity periods in said data processing system.

2. Description of the Prior Art

A timer is a device which can be set to furnish an interrupt or a timeout indication, at a specific time instant or after a selected time interval. Timers are required in communication systems in which protocols require supervision of a very large number of simultaneously occurring events to detect whether the events occurred within predetermined delays. Referring to FIG. 1, three operations are used to implement a timer. A START operation is requested to start the timer for a certain delay TO in order to supervise a corresponding event occurrence. A STOP operation is requested when the supervision of an event occurrence timing has to be interrupted before the expiration of the delay. However, while the timer is still running, a RESTART operation may be requested in order to delay the timing of the corresponding event occurrence by the same delay TO. A new START can be requested if the previous STOP has been performed or if the delay TO has expired and the timer has ended.

In a communication system, because the transmission of messages is very short, thousands of START, RESTART and STOP operations are requested at nearly the same time. Each time a RESTART is requested, many instructions are required from the operating system which impair the performance of the communication system.

In the prior art, each event occurrence is handled by a piece of hardware or a software program. In the case of a hardware implementation, a timing device is used in order not to interrupt frequently the processor. In case of a software implementation, the code calls the Operating System upon each event occurrence to RESTART a timer.

In the software case, great effort has been spent to reduce the CPU utilization induced by restarting the timer thereby improving the restart_timer function performance in the Operating System. In Communication systems, this evolution is linked to the network speeds that grow much faster than processor performances. A European patent application number 92480130.1 discloses a method and an apparatus for implementing an efficient multi-users timer using control blocks which are adapted to the START, STOP and RESTART operations.

FIG. 2 shows an implementation of a hardware timing device in the prior art using a separate timer device 11 that notifies a main processor. In FIG. 2, a generic hardware system handles event occurrence 13 in an event handler machine 10. Upon each event occurrence 13, the event handler 10 raises a signal 14 that resets a hardware timing device 11. The hardware timing device 11 integrates the inactivity of signals for a period. If that period has expired (overflow), the timing device 11 interrupts the main processor 12 through an interrupt signal 15. Then an interrupt handler located in the interrupt processor 12 can now schedule the Inactivity process for that event occurrence. However, such a hardware implementation has a main drawback which is the cost of an external timing device 11.

FIG. 3 shows an implementation of a software timing device in the prior art using an interface queue 24. FIG. 3 describes a system in which each event occurrence 22 received by an event handler machine 20 generates an interrupt 23 directly to a main processor 21 or via an interface queue 24. In this implementation, the processor 21 now participates in the handling of the event occurrence 22. One of the software action during this process is to RESTART an inactivity timer by calling the Operating System. RESTART wastes a lot of processor's instructions overall when many events occur during the delay TO which degrades the performance of the communication system. For instance, previous enhancements in the Operating System (OS) of the IBM Communication Controller 3746-950 which allowed a 50% saving in the restart_timer function path length, lead to 20% traffic improvement. In such a case, however, timers still cost another 20% of the traffic.

Therefore, in any event occurrence driven system, such as a telecommunication Network Node or any other devices that use a timer function of an attached operating system or a timing hardware device to monitor the inactivity of an event, it is desirable to avoid a request to the timer for a RESTART operation when the delay has not expired, especially when a frequent event does not occur during a very long period.

SUMMARY OF THE INVENTION

An object of the invention is to reduce to a minimum the cost of timing and monitoring long period of inactivity of an event in a data processing system.

Another object is to avoid interrupt of a processor uselessly each time an event occurs before the expiration of the delay.

Another object is to avoid the use of the function of the RESTART timer and replace the function by another function that uses as few as possible the number of instructions for a processor.

Another object is to adjust the accuracy of the inactivity according to the performance of the communication system.

These and other objects, features and advantages are achieved in a register implemented as an integrating interface in a device that receives event occurrence signals. Said receiving device performs the function of timing and monitoring of the inactivity period, such that the event occurrence and the interrupt signal of a processor operate independently. Thus the inactivity timing and monitoring functions work on another frequency (fr) which is lower than the event occurrence (fa). The frequency (fr) only depends on the inactivity duration that a user aims to cover according to an expected precision. This expected precision may be adjusted according to the user such that the precision is not the same as the system time tick precision, but can be greater but not lower.

The method of timing and monitoring inactivity periods according to the present invention operates as follows. Upon each event occurrence, an event handler resets a register. During the same time, the inactivity timing and monitoring functions poll that register according to its own frequency. If the register has reached an overflow value, when the delay of inactivity has elapsed, an interrupt signal is generated to a processor to trigger an inactivity process. Otherwise, the inactivity timing and monitoring functions increment the register and loop back to the waiting step of an event occurrence or the next polling of the register.

DETAILED DESCRIPTION OF A PREFERRED EMBODIMENT

Figure 1:
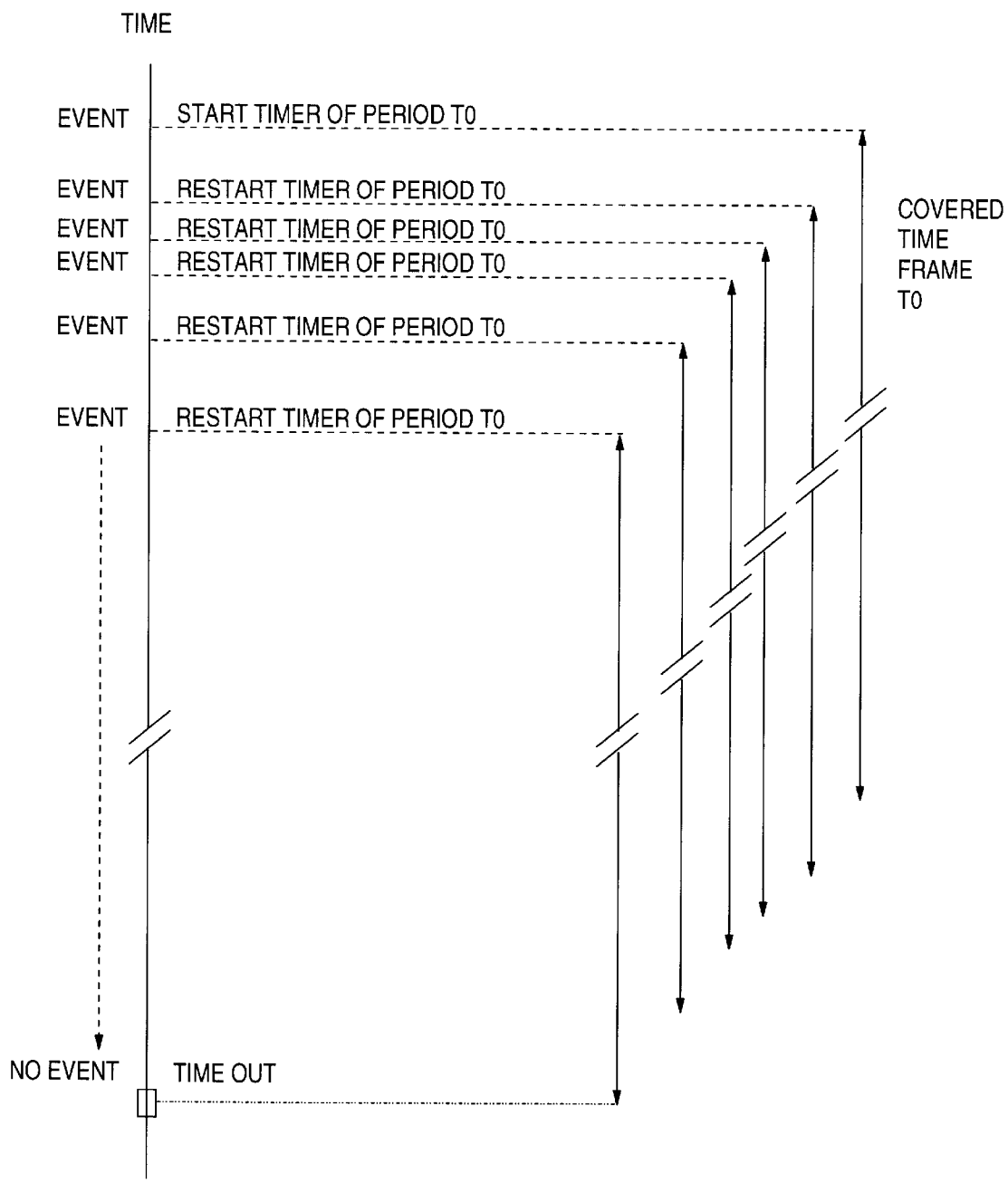
FIG. 1 is a representation of time scheduling in the prior art using the three operations of start, stop and restart.
Figure 2:
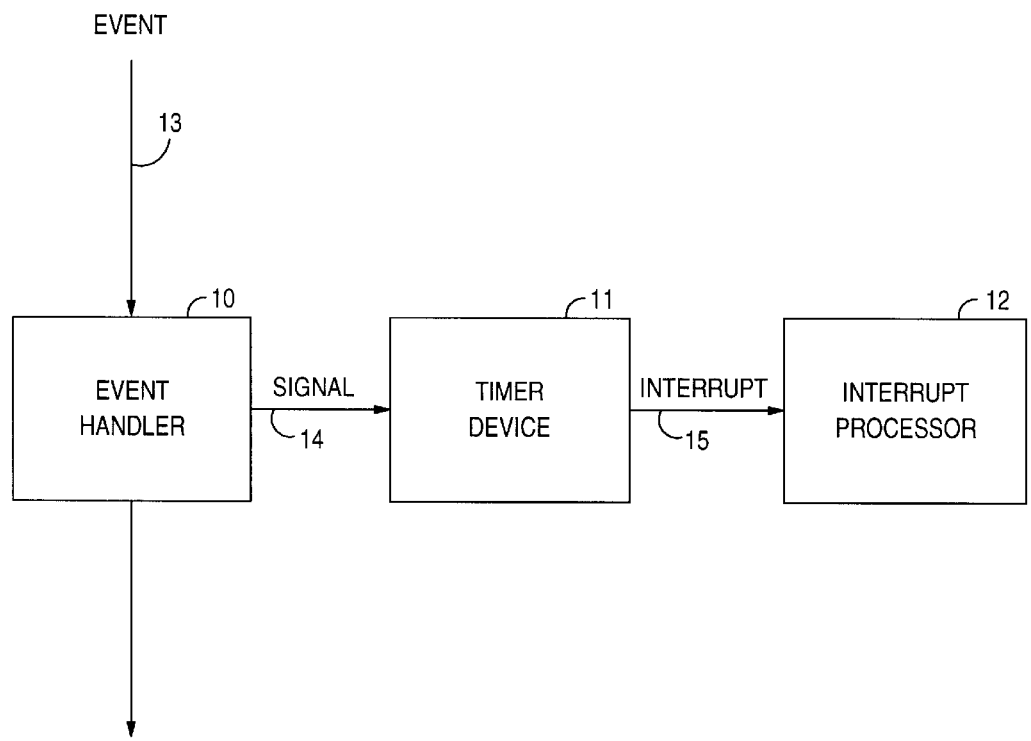
FIG. 2 is a representation of a hardware timing system in the prior art using a timer device.
Figure 3:
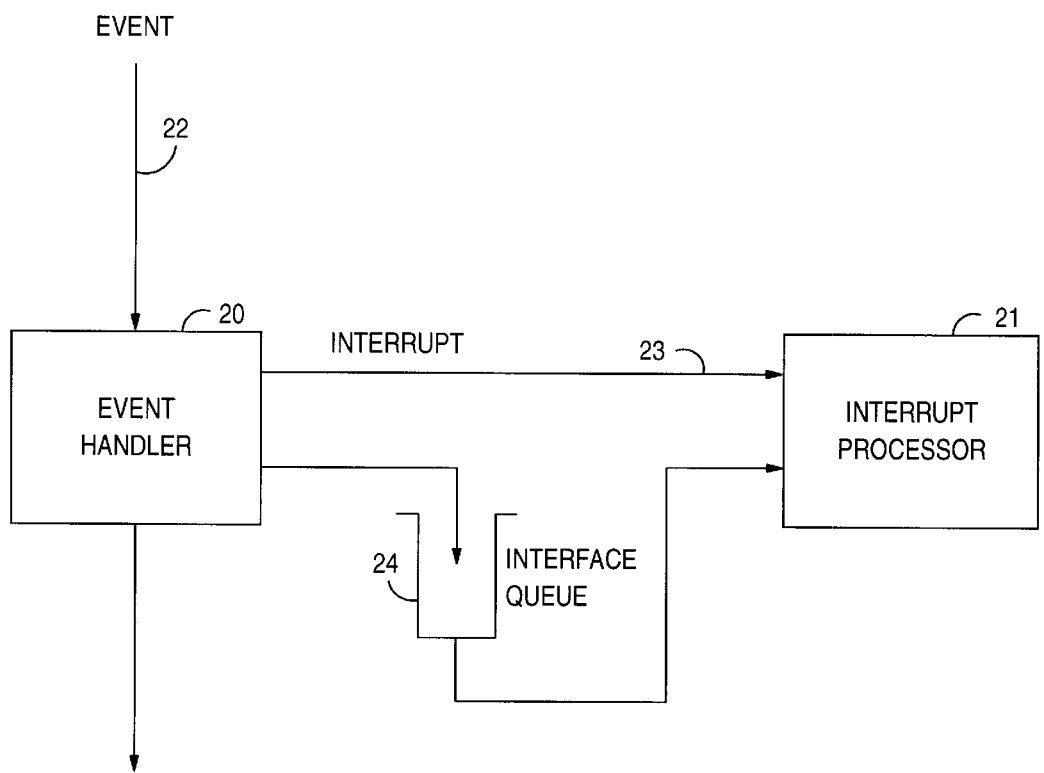
FIG. 3 is a representation of an implementation of a software timing device in the prior art using an interface queue.
Figure 4:
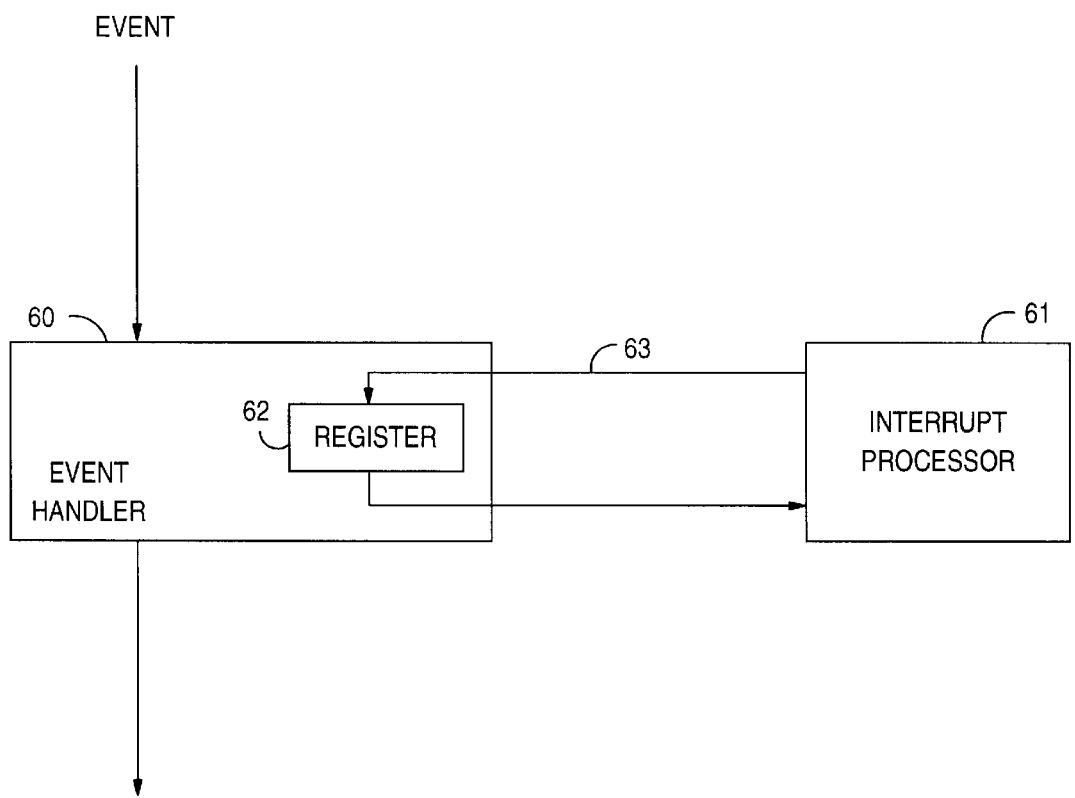
FIG. 4 is a representation according to the present invention of an event handler integrating a register such that an interrupt signal of a processor and an event occurrence signal operate independently.

Referring to FIG. 4, the following description relates to the application of the invention in an IBM 3746-950 which implements a High Performance Routing (HPR) Limited Resource Timer function. The Timer function monitors data traffic inactivity in order to release an HPR connection over a switched medium. The Timer function applies to any system that needs to monitor (by hardware or software) the inactivity of a very frequent event during a relatively long period.

To measure the inactivity of an event during an overall duration D with a precision of X%, we define an Overflow value N==INT(100/X) where INT is an integer function and a polling period T==D/N. If the precision is expressed as an affordable error, d, on the duration, then N==INT(D/d). To some extent, the value of d is equal to T.

The invention adds an interface Register (R) 62 that is:

1. Initialized by a processor 61 before an event flow is started;
2. Reset by an event handler 60 (hard or soft) upon each event occurrence; and
3. Read and incremented by the processor 61 on a periodic basis of period T.

The invention requires a software timer contained in stored program instructions within the processor 61 where the timer is:

1. Of duration T;
2. Started by the processor before the event flow is started; and
3. Started again when the timer pops.

This operation of start again is not the same as the restart operation since in the present case, start again simply means that the duration T (where T is equal to D overall duration/N) has elapsed and the timer starts for another duration T without sending a request of restart to the system processor. On the contrary, in the prior art, since the duration TO has not ended, the timer has to request a restart operation to the system processor in order to set the timer to another duration of TO. The register counts the number of times the timer has started for a period of T.

When the event occurrence handling is implemented by hardware (FIG. 4), the event handling machine 60 needs to present the register R 62 to the software running in a processor 61 such that the processor can read and write the register through I/O operations 63.

Otherwise, which is the case of the 3746-950, a specific location in RAM is dedicated for the event. In the present case, every HPR connection has a dedicated RAM memory location. One information maintained in that location is the interface register 62.

As mentioned above, the event handler is responsible for resetting the register upon each event occurrence.

Whatever the event handling machine is, the software in the processor runs a timer of period T for the monitored event. In the present case, there are as many of these timers as HPR connections which are monitored separately.

The software timer is started when the monitoring starts, which is the connection establishment for the HPR.

Figure 5:
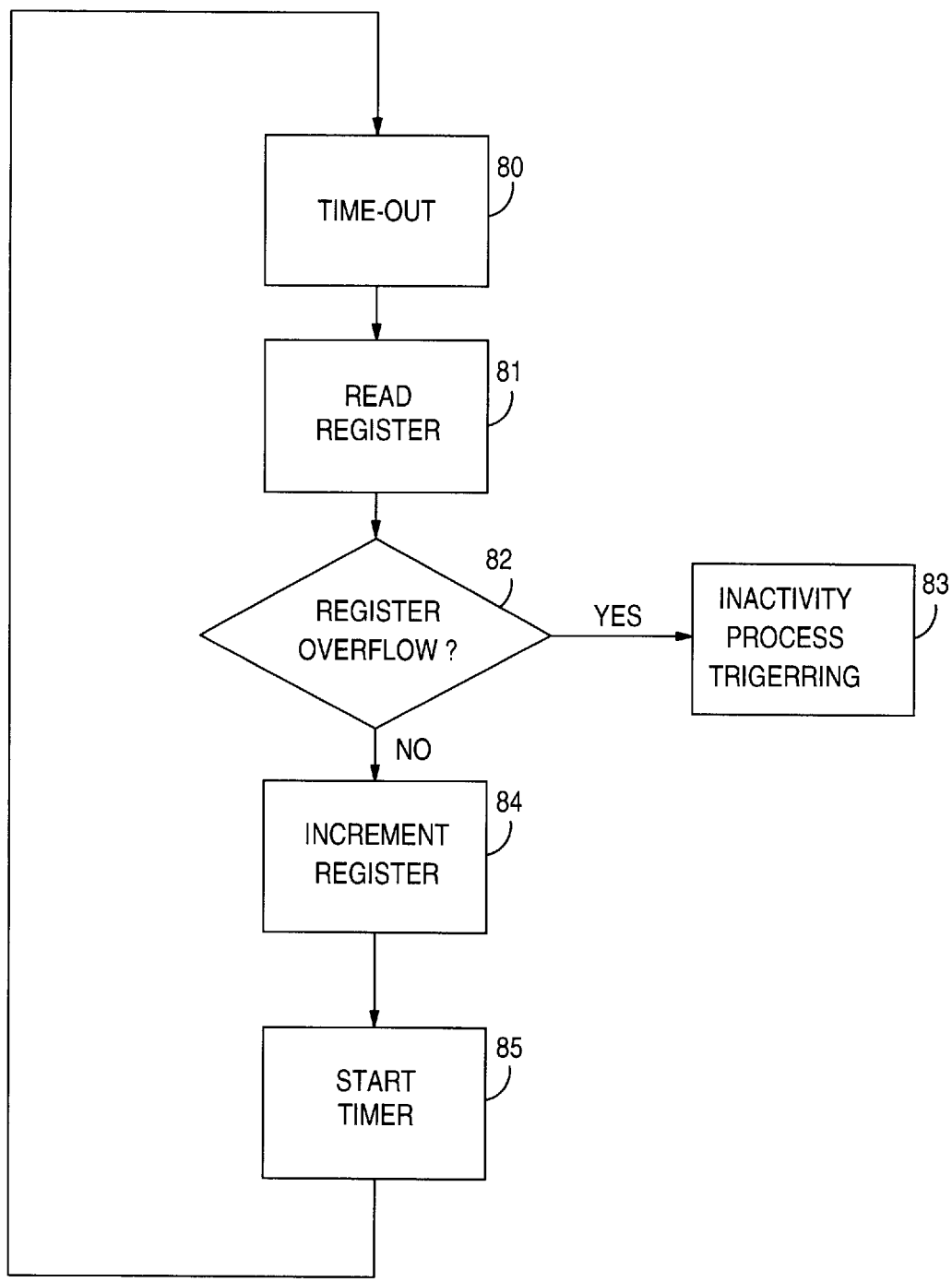
FIG. 5 is a flow chart of the time-out processing according to the present invention.

Referring to FIG. 5, when the timer pops, at step 80, the inactivity timing and monitoring functions read the Register R at step 81. If the register has reached the overflow value N at step 82, then a duration between D and D(+/−d) has elapsed without any event occurrence at step 83. In other words time is out, and whatever process needs to be started in case of inactivity can be triggered. If the value N is not reached, then the register R is incremented at step 84, and the timer can be started again for a duration of T at step 85, after which the timer returns to step 80.

Figure 6:
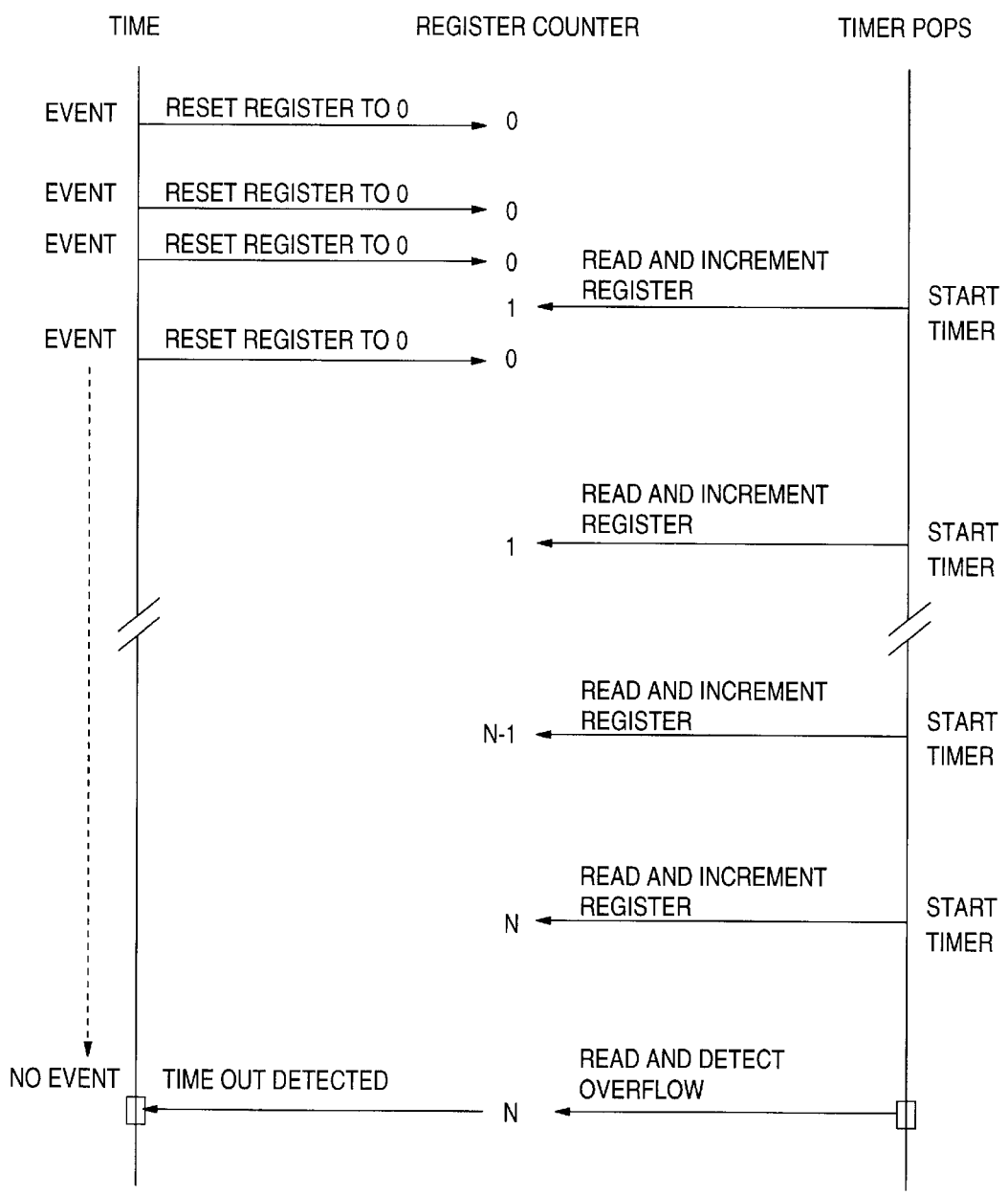
FIG. 6 is a representation of a time schedule according to the present invention.

FIG. 6 shows the time scheduling according to the present invention. The event occurrences and the interrupt signals operate independently. The register is incremented periodically at the frequency of T==D/N (overall duration/precision integer value). But the register is immediately reset at each event occurrence or at the end of the overall duration D. In this example, it is shown that between the last occurrence of the event and the time-out detected, it has elapsed a duration lower than the overall duration D. In another example, it cannot be longer than D+d. Indeed, the precision as implemented is equal to d and the overflow value N is reached when a duration of at least D has elapsed without any event occurrence.

Instead of being restarted on each event occurrence and popped only at the end of the process as in the prior art, the timer is now started again (not restarted as in the prior art) at the end of the delay of T when the timer pops. In the present system, an HPR connection can route thousands of frames per second. If the inactivity duration (range is 0 to 65535 seconds) is of 30 minutes, with a 10⎯1 precision, the present timer will pop and be started again every 3 minutes, which is a ratio of 1/500000 in Processor activity dedicated to timers. Practically, in the case of the IBM 3746-950, the timer cost disappears, and is replaced by a per event occurrence instruction cost of 2, which is also 1/1000 of the total frame routing cost. In other words, the 25% traffic degradation due to inactivity timing and monitoring is now reduced to as low as to 0.1%.

What is claimed is:

1. In a data processing system including an event detector for indicating the occurrence of an event, a method for determining the absence of event detection within a predetermined time period D comprising the steps:

dividing the time period D into a plurality N of substantially equal sub-periods T;

establishing a register;

resetting the register upon the occurrence of an event;

at the termination of each said sub-period T incrementing the registered value and examining the registered value; and, indicating the absence of an event detection within the predetermined time period D when the registered value exceeds N.

2. The method set forth in claim 1 in which the value N is determined by dividing 100 by the desired precision of the determination X% and selecting integer values.

3. The method set forth in either claims 1 or 2 in which the sub-period T depends on the precision desired and equals D/N.

4. In a data processing system including an event detector for indicating the occurrence of an event, an apparatus for determining the absence of event detection within a predetermined time period D comprising:

a register;

means responsive to the occurrence of an event for resetting the register;

means for periodically (T) incrementing the register and examining the registered value; and, means for indicating the absence of an event detection within the predetermined time period D when the registered value exceeds a predetermined value N which is equal to D/T.

* * * * *